J. B. TAINTER & T. PARKER.
Sluice-Gate.

No. 214,324.  Patented April 15, 1879.

Witnesses:  Inventor:
Donn P. Twitchell.  J. B. Tainter
Will N. Dodge  Thomas Parker.
  By Dodge & Son attys

UNITED STATES PATENT OFFICE.

JEREMIAH B. TAINTER AND THOMAS PARKER, OF MENOMONEE, WISCONSIN.

IMPROVEMENT IN SLUICE-GATES.

Specification forming part of Letters Patent No. 214,324, dated April 15, 1879; application filed June 8, 1878.

*To all whom it may concern:*

Be it known that we, J. B. TAINTER and THOMAS PARKER, of Menomonee, in the county of Dunn and State of Wisconsin, have invented certain Improvements in Sluice-Gates, of which the following is a specification.

This invention relates to that class of sluice-gates which are mounted on vertically-swinging arms, and which have an inclination or forward pitch against the current, in order that it shall assist in raising them, the invention being designed more particularly as an improvement on the one described in Letters Patent No. 168,524, dated October 5, 1875; and the improvements consist in connecting the rear ends of the pivoted arms to which the gate is attached to upright pivoted bars, and in connecting and operating these bars simultaneously by means of sliding wedge bars or keys.

Figure 1:
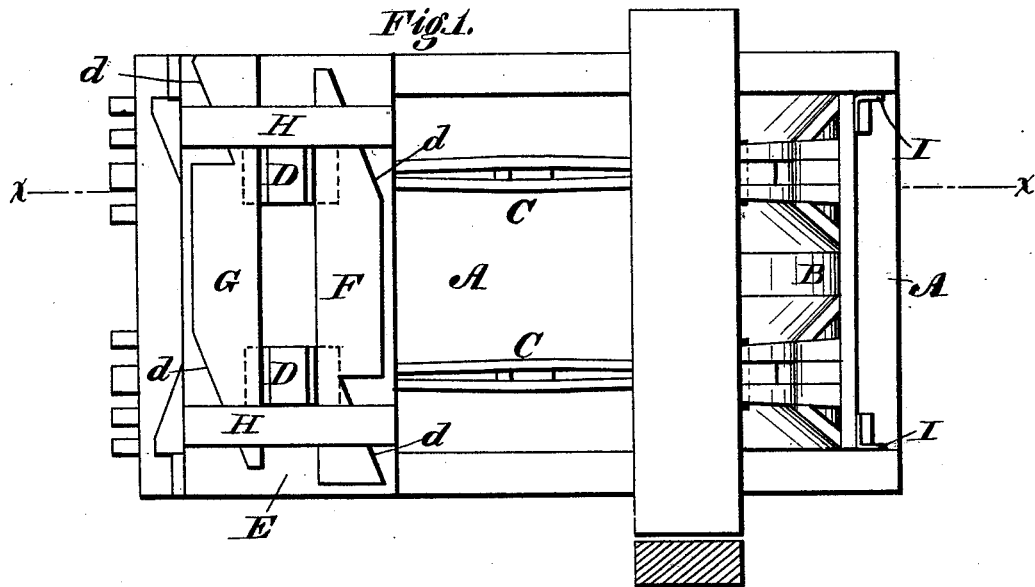
Figure 2:
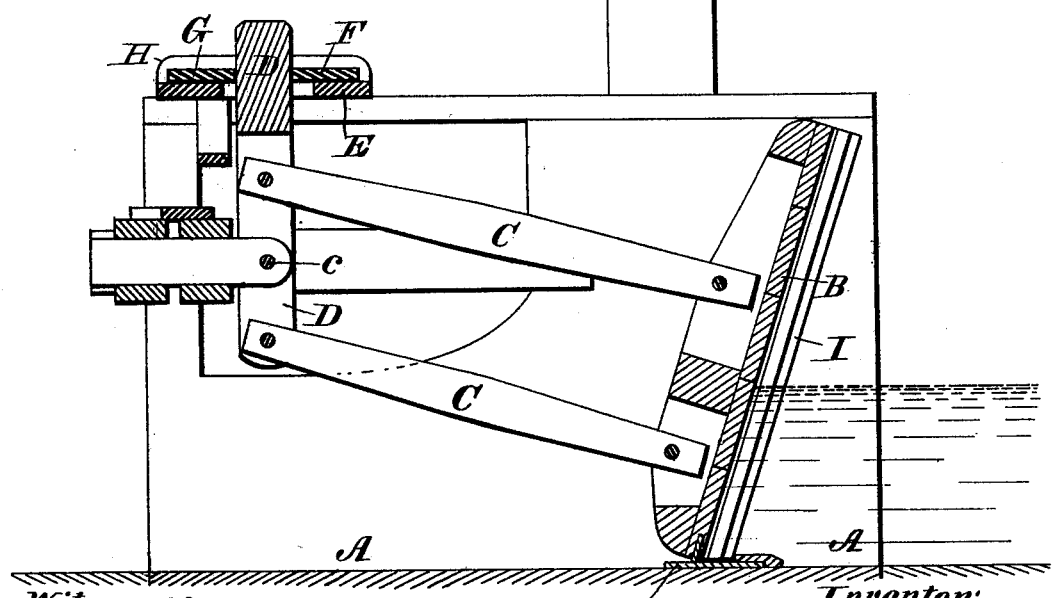

Figure 1 is a top-plan view of our improved gate, and Fig. 2 a longitudinal vertical section of the same on the line $x\ x$ of Fig. 1.

A represents the sluice or race way through which the water passes; B, the transverse gate extending across the sluice from side to side, and having a forward pitch or inclination toward the water.

As shown in the drawings, the gate is supported at each end by two parallel arms or bars, C, arranged one above the other, with their front ends pivoted to the gate and their rear ends to an upright bar, D.

There may be any desired number of pairs of the arms C and their bars D, according to the length and size of the gate.

Each bar D, as shown in the drawings, is mounted between the rear ends of its arms C on a horizontal pivot, $c$, so that by tipping the upper end of the bar forward or backward the gate may be given more or less inclination, as required. For the purpose of operating all the bars D automatically and fastening them in position, we extend their upper ends through a platform or frame, E, on which we mount two longitudinal sliding bars, F and G, bearing against the front and rear sides of the bars D, respectively.

As shown in Fig. 1, the bars F G are mounted in supports H, and are provided with inclined or wedge-shaped bearings $d$, those of the bar F being on the front side and those of the bar G on the rear side, so that as the bars are moved endwise the inclined bearing causes them to move laterally, and thereby move the arms D and gate B.

It will be seen that by driving the bars F G to the right the arms D are tipped forward and the gate given an increased inclination, and that as the bars are moved in the opposite direction a reverse movement of the bar D and the gate takes place.

The bars F G arranged in the manner shown form a very simple and convenient means of adjusting the gate, and at the same time serve to hold the same rigidly at any inclination at which it may be placed.

For the purpose of insuring a close fit of the gate to the sides of the sluice, we provide on the front side of the gate at each end a wide elastic packing-strip, I, having one edge secured firmly by means of cleats and the other edge turned forward and outward against the sides of the sluice, as represented in Figs. 1 and 2. When thus arranged the packing is held by the pressure of the water tightly against the sides of the sluice, and a perfect joint thus produced, while at the same time the arrangement is such as to admit of the gate rising and falling with perfect freedom.

In order to produce a tight joint below the gate, we mount a wide sheet of rubber packing, J, transversely across the bottom of the sluice, as shown in Fig. 2, so that the gate may shut down thereon, the packing being made of such width as to admit of the inclination of the gate being changed without throwing its rear edge beyond the packing.

Having thus described our invention, what we claim is—

The combination of the gate B, arms C, pivoted bar D, and keys F G.

JEREMIAH BURNHAM TAINTER.
THOMAS PARKER.

Witnesses:
GEO. H. SEELY,
THOS. S. HELLER.